United States Patent [19]

Rosthauser et al.

[11] Patent Number: 5,723,194
[45] Date of Patent: Mar. 3, 1998

[54] POLYURETHANE LAYERS WITH HIGHER SURFACE ENERGY

[75] Inventors: James W. Rosthauser, Glendale, W. Va.; Peter H. Markusch, McMurray, Pa.

[73] Assignee: Bayer Corporation, Pittsburgh, Pa.

[21] Appl. No.: 643,436

[22] Filed: May 8, 1996

Related U.S. Application Data

[62] Division of Ser. No. 386,583, Feb. 10, 1995, abandoned.
[51] Int. Cl.$^6$ .................. B32B 3/02; B32B 27/00
[52] U.S. Cl. .................. 428/95; 428/96; 428/423.1
[58] Field of Search .................. 428/95, 96, 423.1

[56] References Cited

U.S. PATENT DOCUMENTS

| | | | |
|---|---|---|---|
| 3,821,130 | 6/1974 | Barron et al. | 260/2.2 BD |
| 3,849,156 | 11/1974 | Marlin et al. | 117/10 |
| 4,035,529 | 7/1977 | Meisert et al. | 427/244 |
| 4,296,159 | 10/1981 | Jenkines et al. | 428/95 |
| 4,657,790 | 4/1987 | Wing et al. | 427/374.1 |
| 4,696,849 | 9/1987 | Mobley et al. | 428/95 |
| 4,853,280 | 8/1989 | Poteet | 428/286 |

*Primary Examiner*—Helen Lee
*Attorney, Agent, or Firm*—Joseph C. Gil; N. Denise Brown

[57] ABSTRACT

The present invention relates to polyurethane layers having higher surface energy. These polyurethane layers are formed on a substrate from a reactive mixture, and comprised of A) a compound containing isocyanate groups, B) an organic compound containing isocyanate-reactive groups, and C) at least one material selected from the group consisting of 1) reactive non-ionic polar materials, 2) reactive ionic polar materials, 3) non-reactive polar materials, and 4) mixtures thereof. Polyurethane layers such as these have been found to have improved adhesion and wet-out properties when used as precoat layers for carpet backing.

10 Claims, No Drawings

POLYURETHANE LAYERS WITH HIGHER SURFACE ENERGY

CROSS-REFERENCE TO RELATED APPLICATIONS

This is a Divisional of application Ser. No. 08/386,583 filed on Feb. 10, 1995 now abandoned.

BACKGROUND OF THE INVENTION

The present invention relates to polyurethane and/or polyurethane-(urea) layers having higher surface energy. These polyurethane and polyurethane(urea) layers are formed on a substrate from a mixture comprised of A) a compound containing isocyanate groups, B) a compound containing isocyanate-reactive groups, and C) at least one material selected from the group consisting of 1) reactive non-ionic polar materials, 2) reactive ionic polar materials, 3) non-reactive polar materials, and 4) mixtures thereof. Polyurethane and polyurethane(urea) layers such as these have been found to have improved adhesion and wet-out properties when used as precoat layers for carpet backing.

Various methods for the production of polyurethane backing on textiles for floor coverings, including carpets are known and described in, for example, U.S. Pat. Nos. 3,849,156, 4,035,529, 4,657,790 and 4,853,280. The process of U.S. Pat. No. 3,849,156 comprises applying a froth directly to the back of carpeting, shaping the froth into the desired shape, and curing the shaped froth at a temperature of at least 70° C. to form a polyurethane foam backing on the carpeting material. This polyurethane comprises a substantially non-aqueous mixture of a polyisocyanate, an active hydrogen-containing material, an organosilicon surfactant, and a catalyst having substantial activity only at temperatures of at least 70° C. An inert gas is dispersed throughout the mixture by mechanical beating of the mixture to form a heat curable froth. Carpet fibers and textile filaments may not be firmly enough locked into the carpeting by these mechanically frothed foams, i.e., the "tuft lock" strength may be too low to maintain integrity of the carpet under heavy use conditions.

U.S. Pat. No. 4,035,529 describes a process using two coats of polyurethane backings for floor coverings having improved fixing of textile filaments, i.e., higher "tuff lock", and increased stiffness of the carpet. This process comprises applying a first coat to a textile floor coveting, a precoat, which consists essentially of a polyol and a large excess of an isocyanate. To assure good intercoat adhesion between coats, a foamable main coat of substantially equivalent amounts of a polyol and an isocyanate are then applied before the first coat is hardened, and both coats are subsequently hardened in a heating zone. The "open time", that is, the time that elapses between application of the precoat and the foamable main coat is limited.

U.S. Pat. No. 4,657,790 relates to the use of general polyurethane formulation in a specific process. This process comprises forming a precoat layer of a reaction mixture comprising a curable polymer-forming composition, separately forming a capcoat layer of a mixture comprising a curable polymer forming composition, contacting the precoat layer with one surface of the substrate before the precoat layer is tack free, contacting the capcoat layer with one surface of the precoat layer before either the precoat layer or the capcoat layer is tack free, completing the curing of the capcoat and precoat layers, and cooling the polymer backed substrate to less than about 35° C. before mechanical distortion. This process is carried out under conditions such that mechanically induced stress is minimized. This process has the disadvantage that the capcoat is produced separately and then laminated to the precoat in an additional manufacturing step.

The multi-layered polymer backed floor covering of U.S. Pat. No. 4,853,280 is releasable. It allows the entire installed carpet or carpet padding to be easily removed from the floor surface without tearing so that portions of it do not remain on the floor surface. The backing comprises a facing layer and a bottommost release backing layer both comprising a non-woven fabric, and a polymer layer bonded to the release layer on one side and directly or indirectly to the facing layer on the other side. A precoat layer may be used between the facing layer and the polymer layer. This backing is produced by applying a layer of an uncured polymer-forming composition to the back side of a textile, applying a layer of a non-woven fabric to the polymer backing, and curing the polymer forming composition to a tack free state. In order for the carpet to be releasable when a precoat is used, the adhesion between the precoat and foamable layer has to be sufficient to avoid delamination at that interface. Most commonly, latex based precoats are used to assure adequate interfacial adhesion; however, these latex materials may potentially contain volatile organic compounds.

Polyurethane unitary layers that may be used as precoats are described, for example, in U.S. Pat. Nos. 4,269,159 and 4,696,849. Polyurethane backed carpeting is the subject of U.S. Pat. No. 4,296,159. These carpets comprise a primary backing, a yarn tufted or woven through the primary backing to create a bundle on the underside of the tufted good, and a polyurethane composition is then applied to the underside to encapsulate the yarn bundles to the primary backing providing high "tuff lock". This polyurethane composition comprises a high molecular weight polyether polyol, a low molecular weight polyol, and organic polyisocyanate or polyisothiocyanate, and an inorganic filler. The isocyanate used in the examples are either isocyanate prepolymers based on toluene diisocyanate, or a modified diphenylmethane diisocyanate.

U.S. Pat. No. 4,696,849 discloses polyurethane compositions suitable for carpet backing comprising isocyanates with a high equivalent weight polyol composition containing at least 30% primary hydroxyl groups, a low equivalent weight compound having 2 active hydrogen atoms, and a catalyst. Toluene diisocyanate, 2,4'- and 4,4'-diphenylmethane diisocyanates, and the isocyanate-terminated prepolymers thereof are said to be suitable isocyanates. The average functionality of the reactive components (i.e. all the active hydrogen containing components and isocyanates) must range from 1.97 to 2.03.

Problems associated with the processes disclosed in U.S. Pat. Nos. 4,269,159 and 4,696,849, however, can include poor adhesion of foamed polyurethane layers that are subsequently spread onto these unitary backings when they are used as precoat layers. These polymer surfaces can be difficult to wet-out with the uncured foamed layer and thus may result in the formation of craters and bubbles in the foamed layer.

The polyurethane layers of the present invention have increased surface energy. This can result not only in improved adhesion of the precoat layer to the jute or primary backing but also in improved adhesion of the foamed layer to the precoat layer. The wet-out of foamed polyurethane layers that are subsequently spread onto these precoat layers can be improved in comparison to those described in U.S. Pat. Nos. 4,296,159 and 4,696,849 as a result of these increased surface energies of the polyurethane layer.

DESCRIPTION OF THE INVENTION

The present invention relates to polyurethane and polyurethane-(urea) layers having higher surface energy. The surface energy of these polyurethane and polyurethane (urea) layers is from about 45 to about 70 dynes/ore at room temperature. These polyurethane and polyurethane-(urea) layers are formed on a substrate from a reactive mixture comprising A) one or more compounds containing isocyanate groups, B) one or more non-polar organic compounds containing isocyanate-reactive groups, and C) a material selected from the group consisting of 1) reactive non-ionic polar materials, 2) reactive ionic polar materials, 3) non-reactive polar materials, and 4) mixtures thereof, wherein C) is present in a sufficient amount such that the polar contribution towards the surface energy is between about 10 and 40 dynes/cm.

The polyurethane and, optionally, polyurethane(urea) layers preferably have a surface energy of 50 to 65 dynes/cm. It is also preferred that component C) be present in the reaction mixture in a sufficient quantity such that the polar contribution to the surface energy is preferably between about 15 and 30 dynes/cm at room temperature.

In a preferred embodiment, the ratio of the total of the isocyanate groups from component A) to the sum of the isocyanate-reactive groups from B) and those from C)1) and C)2) is from 0.85:1 to 1.15:1. It is also preferred that the total amount of the polar materials C) comprises from 0.5 to 10% by weight, and preferably 2 to 6% by weight based on the total weight of components A), B), and C). Polyurethane and polyurethane(urea) layers such as these have been found to improve the adhesion and wet-out of precoat layers for carpet backing.

In a preferred embodiment of the present invention, the isocyanate group containing compound A) comprises an isocyanate prepolymer prepared by reacting a compound containing isocyanate groups with C) a material selected from the group consisting of 1) reactive non-ionic polar materials, 2) reactive ionic polar materials, and mixtures thereof. These isocyanate prepolymers are preferably blended with another compound containing isocyanate groups, and the blend is used as the isocyanate component. The blend of the isocyanate prepolymer and isocyanate compound(s) is then combined with the non-polar organic compound containing isocyanate-reactive groups B), and, if desired, C) at least one polar material selected from the group consisting of 1) reactive non-ionic polar materials, 2) reactive ionic polar materials, 3) non-reactive polar materials, and 4) mixtures thereof, to form the polyurethane and polyurethane(urea) layer of the present invention. It is essential that component C) always be present in a sufficient amount such that the polar contribution towards the surface energy is between 10 and 40 dynes/cm.

When isocyanate prepolymers are used, it is preferred that the isocyanate A) comprises polymethylene poly (phenylisocyanate), adducts of diphenyl methylene diisocyanate (MDI), 2,4'- and 4,4'- MDI monomer and/or adducts of polymethylene poly(phenylisocyanate), in admixture with 2,4'- and 4,4'-MDI monomer.

In another embodiment, B) the one or more non-polar organic compounds containing isocyanate-reactive groups are mixed with C) at least one material selected from the group consisting of 1) reactive non-ionic polar materials, 2) reactive ionic polar materials, 3) non-reactive solid, polar materials, and 4) mixtures thereof to form a blend. This blend can then be reacted with the isocyanate component A) to form the polyurethane and polyurethane(urea) layers of the present invention. As set forth hereinabove, component C) must always be present in a sufficient amount such that the polar contribution towards the surface energy is between 10 and 40 dynes/cm.

For purposes of the present invention, component B), the organic compounds containing isocyanate-reactive groups are considered to be "non-polar" even though these compounds do exhibit some polarity. However, the polarity of these types of compounds is not sufficient to increase the polar contribution to the surface energy of the polyurethane layer to between 10 and 40 dynes/cm. Accordingly, these compounds are referred to in the present application as being non-polar.

It is also preferred that the non-polar organic compound containing isocyanate-reactive hydrogen atoms B), comprises 1) at least one organic compound having a relatively high molecular weight and containing at least two isocyanate-reactive hydrogen atoms, and 2) at least one chain extender. Both of these are also considered to be non-polar in the context of the present application as set forth hereinabove.

This polyol mixture which is to be reacted with the isocyanate compound in the preparation of the polyurethane carpet backing may additionally comprise flame retardants, fillers, blowing agents, surfactants, catalysts, colorants, anti-static agents, reinforcing fibers, antioxidants, preservatives, water scavengers, and other typical additives known to be useful in polyurethane chemistry.

Suitable isocyanates to be used in the present invention include the aliphatic, cycloaliphatic, araliphatic, aromatic, and heterocyclic isocyanates known in the field of polyurethane chemistry. These are described in, for example, U.S. Pat. Nos. 4,868,224, 3,401,190, 3,454,606, 3,277,138, 3,492,330, 3,001,973, 3,394,164, 3,124,605, and 3,201,372, the disclosures of which are herein incorporated by reference in the entirety. Especially suited are the monomeric and polymeric MDI isocyanates and adducts of these polyisocyanates because of their favorable reactivity/property profile.

Suitable non-polar organic compounds containing isocyanate-reactive groups to be used in the present invention include those known and used in the field of polyurethane chemistry. These include, for example, polyether polyols, polyester polyols, etc. such as those described in, for example, U.S. Pat. Nos. 4,296,159, 4,394,491, and 4,935,885, the disclosures of which are herein incorporated by reference in their entirety. In accordance with the present invention, it is preferred that the non-polar organic compound(s) containing isocyanate-reactive groups is a mixture which comprises at least one relatively high molecular weight compound and at least one relatively low molecular weight compound.

The specific list of references set forth hereinabove includes suitable descriptions of both 1) organic compounds having a molecular weight of from 400 to 10,000, preferably from 1000 to 5000, and containing at least two isocyanate-reactive hydrogen atoms, preferably two to three isocyanate-reactive hydrogen atoms, and 2) organic compounds containing at least two isocyanate reactive groups and having a molecular weight ranging from 18 to 400, preferably from 60 to 200. These are commonly referred to as 1) polyols and 2) chain extenders. Water is also considered a suitable chain extender for the present invention.

It is possible to use the preferred high molecular weight diols, triols, and mixtures thereof in combination with a small quantity of an organic isocyanate-reactive group containing compound having a higher functionality along with some mono-functional isocyanate-reactive group containing compound. Particularly preferred high molecular weight compounds include polyether polyols. This is due to their low viscosity.

The preferred low molecular weight compounds are the well known chain extenders which most preferably contain OH-groups such as, for example, diols. Particularly preferred chain extenders include, for example, diethylene glycol, triethylene glycol, ethylene glycol, 1,4-butanediol, and mixtures thereof. Of course, it is possible to use organic isocyanate-reactive compounds which contain NH groups. This, however, is less preferred due to their high reactivity.

When water is used as a chain extender in the present invention, it can advantageously function as a blowing agent when the higher surface energy layers of the present invention are used as unitary carpet backings.

In order to increase the polar contribution towards the surface energy of the polyurethane layers, C) a material selected from the group consisting of 1) reactive non-ionic polar materials, 2) reactive ionic or potentially ionic polar materials, 3) non-reactive solid, polar materials, and 4) mixtures thereof are incorporated into the reactive mixture to form a polyurethane or polyurethane(urea). Component C) must be present in a sufficient quantity such that the polar contribution towards the surface energy is between 10 and 40 dynes/cm.

The reactive non-ionic groups may be chemically incorporated or blended into the isocyanate-terminated prepolymer A) or may be chemically incorporated or blended into the isocyanate reactive component B). Suitable compounds for incorporating these groups include:

i) monoisocyanates or diisocyanates which contain non-ionic groups and the more preferred ii) compounds which are monofunctional or difunctional in the isocyanate-polyaddition reaction and contain non-ionic groups.

Reactive non-ionic polar materials include, for example, suitable compounds for incorporating lateral or terminal, polar ethylene oxide units which may be either monofunctional or difunctional in the context of the isocyanate-polyaddition reaction. Isocyanate functional group containing materials include:

a) diisocyanates which contain lateral, polar ethylene oxide units, and b) monoisocyanates which contain terminal, polar ethylene oxide units.

Isocyanate-reactive materials include:

c) compounds which are difunctional in the isocyanate-polyaddition reaction and contain lateral, polar ethylene oxide units, d) compounds which are monofunctional in the isocyanate-polyaddition reaction and contain terminal, polar ethylene oxide units, and e) mixtures thereof.

The reactive, non-ionic polar materials which contain isocyanate functional groups are typically blended with the isocyanate component A) of the reactive mixture that forms the polyurethane(urea) layer, but they may also be pre-reacted with the active-hydrogen containing component B) in a less preferred embodiment of the current invention. Compounds corresponding to the following general formula:

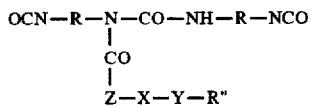

are typically blended into the isocyanate component A).

In general formula (I) above,

R represents a difunctional radical of the type obtained by removing the isocyanate groups from a diisocyanate corresponding to the general formula:

of the above-mentioned type;

R" represents a monovalent hydrocarbon radical having from 1 to 12 carbon atoms, preferably an unsubstituted alkyl radical having from to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxide such as propylene oxide, butylene oxide or styrene oxide units, preferably propylene oxide units;

Y represents oxygen or —NR'''— wherein R''' has the same definition as R", and

Z represents a radical which corresponds to Y, but may additionally represent —NH—.

The compounds corresponding to general formula (I) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segments of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred polar components for incorporating lateral or terminal polar chains containing ethylene oxide units include isocyanate-functional group containing compounds corresponding to the following general formula:

wherein X, Y, Z, R and R" are as defined above; and Y' corresponds in its meaning to Y, but may additionally represent —NH—.

Suitable isocyanate-reactive materials include compounds such as, for example, the preferred difunctional nonionic polar components having lateral polar chains containing ethylene oxide units include compounds corresponding to the following general formula:

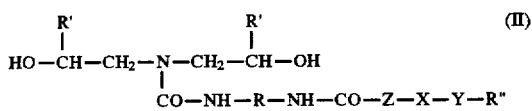

(II)

which are typically blended into the isocyanate reactive component.

Preferred difunctional polar components are those corresponding to general formula (II) above.

in general formula (II) above,

R represents a difunctional radical of the type obtained by removing the isocyanate groups from a diisocyanate corresponding to the general formula:

of the above-mentioned type;

R' represents hydrogen or a monovalent hydrocarbon radical containing from 1 to 8 carbon atoms, preferably a hydrogen atom or a methyl group;

R" represents a monovalent hydrocarbon radical having from 1 to 12 carbon atoms, preferably an unsubstituted alkyl radical having from 1 to 4 carbon atoms;

X represents the radical obtained by removal of the terminal hydroxyl group from a polyalkylene oxide chain having from about 5 to 90 chain members, preferably from about 20 to 70 chain members, of which at least about 40%, preferably at least about 65%, comprises ethylene oxide units and the remainder comprises other alkylene oxide such as propylene oxide, butylene oxide or styrene oxide units, preferably propylene oxide units;

Y represents oxygen or —NR'"— wherein R'" has the same definition as R", and

Z represents a radical which corresponds to Y, but may additionally represent —NH—.

The compounds corresponding to general formula (II) above may be produced by the methods according to U.S. Pat. Nos. 3,905,929 and 3,920,598 (the disclosures of which are herein incorporated by reference). In addition to the disclosures of these two patents, it is noted that instead of using the monofunctional polyether alcohols mentioned therein as starting materials, it is also possible to use those of the type where the polyether segment, in addition to ethylene oxide units, also contains up to 60% by weight based on polyether segments of other alkylene oxide units such as propylene oxide, butylene oxide or styrene oxide units, preferably propylene oxide units. The presence of such "mixed polyether segments" may afford specific advantages in certain cases. These "mixed polyether segments" are described in U.S. Pat. No. 4,190,566, the disclosure of which is herein incorporated by reference.

Other particularly preferred polar components for incorporating lateral or terminal polar chains containing ethylene oxide units include isocyanate-reactive compounds corresponding to the following general formula:

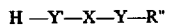

wherein X, Y, Z, R and R" are as defined above; and Y' corresponds in its meaning to Y, but may additionally represent —NH—.

Isocyanate-reactive materials such as polyols are commonly used. Monofunctional polyethers are preferably used.

In order to guarantee the required high molecular weight structure of the polyurethane or polyurethane(urea) layer, it is preferred that these monofunctional polyethers are only used in quantities of up to 10%, based on the total weight of components A), B), and C). In cases where relatively large quantities of monofunctional alkylene oxide polyethers are used, it is advantageous to also use trifunctional starting compounds, although the average functionality of the polymer starting components should preferably not exceed about 2.6.

The monofunctional polar components are produced in accordance with the processes described in U.S. Pat. Nos. 3,905,929 and 3,920,598 by alkoxylating of a monofunctional starter, such as n-butanol, using ethylene oxide and optionally another alkylene oxide, for example propylene oxide. The resultant product may be optionally further modified (although this is less preferred) by reaction with excess quantities of diisocyanates or by reaction with ammonia to form the corresponding primary aminopolyethers.

The content of polar ethylene oxide units may be up to about 10%, preferably up to about 8%, more preferably about 1 to 6% and most preferably about 2 to 6% by weight based on the weight of the polyurethane(urea). In addition, up to about 75% of the allowable, chemically incorporated, polar ethylene oxide units may be replaced by the known nonionic, external emulsifiers such as those of the aralkyl type such as polyoxyethylene nonyl phenyl ether or polyoxyethylene octyl phenyl ether, those of the alkyl ether type such as polyoxyethylene lauryl ether or polyoxyethylene oleyl ether; those of the alkyl ester type such as polyoxyethylene laurate, polyoxyethylene oleate or polyoxyethylene stearate; and those of the polyoxyethylene benzylated phenyl ether type.

it is most preferred that reactive non-ionic polar materials are compounds which are monofunctional in the isocyanate-polyaddition reaction and contain terminal polar ethylene oxide units.

it is also possible to increase the surface energy of the polyurethane or polyurethane(urea) layer by the chemical incorporation of ionic or potential ionic groups. These ionic or potential ionic groups may be either anionic or cationic, and are preferably anionic. Some suitable examples of anionic groups include carboxylate and sulfonate groups, while some suitable examples of cationic groups include ammonium and sulfonium groups. The ionic groups are incorporated in an amount sufficient to increase the polar contribution towards the surface energy of the polyurethane (urea) layer to between 10 and 40 dynes/cm. The upper limit for the content of reactive compounds containing ionic groups is preferably 10%, more preferably 6% of potyurethane(urea).

It is preferred that these reactive ionic groups are anionic groups. Of the compounds containing anionic groups, it is most preferred that compounds containing these anionic groups are selected from the group consisting of compounds containing carboxylate groups and compounds containing sulfonate groups.

The reactive ionic or potential ionic groups may be chemically incorporated or blended into the isocyanate-terminated prepolymer A) or may be chemically incorporated or blended into the isocyanate reactive component B). Suitable compounds for incorporating these groups include:

i) monoisocyanates or diisocyanates which contain ionic groups and the more preferred ii) compounds which are monofunctional or difunctional in the isocyanate-polyaddition reaction and contain ionic or potential ionic groups.

The ionic groups are formed by neutralizing the corresponding potential ionic groups either prior to, during or after formation of the blended component mixture containing isocyanate-reactive groups. When the potential ionic groups are neutralized odor to their incorporation into the mixture, the ionic groups are incorporated directly. When neutralization is performed subsequent to blending the isocyanate reactive component mixture, potential ionic groups are incorporated.

Suitable compounds for incorporating the carboxylate, sulfonate and quaternary nitrogen groups are described in U.S. Pat. Nos. 3,479,310, 4,108,814 and 4,303,774, the disclosures of which are herein incorporated by reference. Suitable compounds for incorporating tertiary sulfonium groups are described in U.S. Pat. No. 3,419,533, also incorporated by reference. The preferred sulfonate groups for incorporation into the isocyanate-terminated propolymer are the diol sulfonic acids or the diol sulfonates disclosed in U.S. Pat. No. 4,108,814.

The neutralizing agents for converting the potential ionic groups to ionic groups are described in the preceding U.S. patents and are also discussed hereinafter. Within the context of this invention, the term "neutralizing agents" is meant to embrace all types of agents which are useful for converting potential ionic groups to ionic groups.

The preferred carboxylate groups for incorporation into the isocyanate-terminated prepolymer are derived from hydroxycarboxylic acids of the general formula:

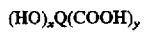

(HO)$_x$Q(COOH)$_y$ wherein
Q represents a straight or branched, hydrocarbon radical containing 1 to 12 carbon atoms, and
x and y represent values from 1 to 3.

Examples of these hydroxycarboxylic acids include citric acid and tartaric acid.

The preferred acids are those of the above-mentioned formula wherein x=2 and y=1. These dihydroxy alkanoic acids are described in U.S. Pat. No. 3,412,054, herein incorporated by reference. The preferred group of dihydroxy alkanoic acids are the α,α-dimethylol alkanoic acids represented by the structural formula

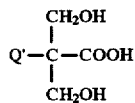

$$\begin{array}{c} CH_2OH \\ | \\ Q'-C-COOH \\ | \\ CH_2OH \end{array}$$

wherein Q' is hydrogen or an alkyl group containing 1 to 8 carbon atoms. The most preferred compound is α,α-dimethylol propionic acid, i.e., when Q' is methyl in the above formula.

When incorporating the anionic or potential anionic groups through the chain extender used to convert the isocyanate-terminated prepolymer to the polyurethane (urea), it is possible to use amino functional compounds containing anionic or potential anionic groups such as the diamino carboxylic acids or carboxylates disclosed in U.S. Pat. No. 3,539,483 or salts of 2,6-diaminohexanoic acid. When sulfonate groups are desired, they may be incorporated through the chain extenders using salts of isethionic acid or preferably diamino sulfonates of the formula

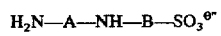

H$_2$N—A—NH—B—SO$_3^{\ominus}$ wherein A and B represent aliphatic hydrocarbon radicals containing 2 to 6 carbon atoms, preferably ethylene groups.

Whether the anionic groups are incorporated into the polyurethane-(urea) via the prepolymer A) or the isocyanate reactive component B) is not critical. Therefore, the anionic groups may exclusively be incorporated via the prepolymer or via the isocyanate reactive component B), or a portion of the anionic groups may be introduced according to each alternative.

It is also possible to increase the surface energy of the polyurethane or polyurethane(urea) layer by the incorporation of non-reactive polar materials. These non-reactive polar materials may be either non-reactive solid, polar materials or non-reactive liquid, polar materials. It is preferred that the non-reactive polar materials C)3) are physically blended into the reaction components, and preferably into component B). When used, these materials are present in the reaction mixture in a sufficient quantity such that the polar contribution towards the surface energy is between 10 and 40 dynes/cm.

Most of these non-reactive solid, polar materials contain ionic groups. These ionic groups may be either anionic or cationic, and are preferably anionic. Some suitable examples of anionic groups include carboxylate and sulfonate groups, while some suitable examples of cationic groups include ammonium and sulfonium groups. The non-reactive solid, polar materials are incorporated in an amount sufficient to increase the surface energy of polyurethane(urea) to at least 45 dynes/cm. The upper limit for the content of non-reactive solid, polar materials containing ionic groups is preferably 10%, more preferably 6% of polyurethane(urea) layer.

These non-reactive solid polar materials are most conveniently added to the active hydrogen-containing component by dispersing the solids into the mixture, but they may also be added to the isocyanate component. Care must be taken to remove water of hydration or water that is often adsorbed on the surface of these solid polar materials to avoid premature reaction of the water with the isocyanate or to avoid bubbling in the polyurethane(urea) layer. It is advantageous to use these non-reactive solid polar materials in combination with the reactive, non-ionic polar materials mentioned above to provide a more stable dispersion of the non-reactive solid polar materials in the liquid hydrogen-containing component or in the isocyanate component.

Suitable examples of non-reactive solid polar materials are commonly used, and are familiar to those skilled in the art, as surfactants or wetting agents in the cosmetic, personal care, shampoo, and soap industries. They include, but are not limited to, metal salts of sulfonated fatty acids, metal salts of alkyl substituted sulfonated aromatic hydrocarbons, metal salts of alkyl substituted sulfosuccinates and their esters, metal salts of cellulose derivatives and carboxymethyl cellulose derivatives, metal salts of lignosulfates, metal salts of fatty carboxylic acids, silicates, magnesium silicates, magnesium aluminum silicates, and clays. Illustrative examples of these materials include alkali metal salts of lauryl sulfates, metal salts of dodecylbenzene sulfonate, the various metal stearates, and hectorite, montmorillonate, attapulgite, and bentonite clays. A preferred non-reactive solid polar material is sodium lauryl sulfate.

It is also possible to increase the surface energy of the polyurethane or polyurethane-urea layer by the incorporation of non-reactive liquid polar materials, most of which also contain ionic groups. These materials often contain ionic groups, which may be either anionic or cationic, and are preferably anionic. Some suitable examples of anionic groups include phosphate, carboxylate, and sulfonate groups, while some suitable examples of cationic groups include ammonium, and sulfonium groups. The non-reactive liquid polar materials are incorporated in an amount sufficient to increase the surface energy of polyurethane(urea) to at least 45 dynes/cm. The upper limit for the content of non-reactive liquid polar materials containing ionic groups is preferably 10%, more preferably 6% of polyurethane (urea).

Suitable examples of non-reactive liquid polar materials are commonly used as surfactants or pigment (or filler) suspending agents or wetting agents in the coatings and sealants industries. They include, but are not limited to, solutions of many of the previously mentioned non-reactive polar solid materials or of solutions of the metal salts of polyacrylates in water and various organic solvents. Solutions of organo titanates and zirconates are also suitable, including the various neoalkoxy, di- and tri-neoalkoxy substituted ones and the substituted phosphato titanates and zirconates, all commercially available from Kendrich Petrochemicals, Inc. of Bayonne, N.J. Also suitable are the liquid substituted ammonium lauryl sulfates, amine neutralized polyesters, ammonium salts of fatty acids, salts of amides of fatty acids, modified alkanolamides of fatty acids, and various condensates containing alkanolamines. Preferred non-reactive liquid polar materials are solutions of proprietary phosphated polyesters and proprietary partial salts of these polyesters and proprietary salts from alkylamides and esters commercially available from Byk Chemie USA of Wallingford, Conn.

These non-reactive liquid polar materials are also most conveniently added to the active hydrogen-containing component by blending them into the mixture, but they may also be added to the isocyanate component. It is preferred to remove solvents by evaporation after mixing them with the active hydrogen-containing component.

It is also within the scope of the present invention that the reaction mixture additionally comprise additives which are typical in polyurethane formulations. Some examples of these include catalysts, surfactants, flame retardants, fillers, blowing agents, etc. Among these other additives, fillers, surfactants and catalysts are preferred. Some of these additives may appear to fall within the scope of the hereinabove disclosed non-reactive polar materials as they are both "non-reactive" and "polar" compounds. However, the usual quantities of these additives present in polyurethane formulations is not a sufficient quantity such that the polar contribution towards the surface energy of the polyurethane layer is between 10 and 40 dynes/cm. To attain the required polar contribution towards surface energy of between 10 and 40 dynes/cm, the necessary quantity of these additives would be so high as to be unreasonable from a practical standpoint other than for the purpose of the present invention.

Suitable catalysts to be used in the present invention include, for example, tertiary amine compounds and organometallic catalysts. The preferred catalysts are heat-activated.

Some examples of suitable organometallic catalysts include, for example organometallic compounds of tin, lead, iron, bismuth, mercury, etc. Preferred organotin catalysts include compounds such as, for example, tin acetate, tin octoate, tin ethylhexanoate, tin oleate, tin laurate, dimethyltin dilaurate, dibutyltin oxide, dibutyltin dichloride, dimethyltin dichloride, dibutyltin diacetate, diethyltin diacetate, dimethyltin diacetate, dibutyltin dilaurate, diethyltin dilaurate, dimethyltin dilaurate, dibutyltin maleate, dimethyltin maleate, dioctyltin diacetate, dioctyltin dilaurate, di(2-ethylhexyl)tin oxide, etc. Delayed action or heat-activated tin catalysts such as, for example, dibutyltin dimercaptide, dibutyltin diisooctylmer-captoacetate, dimethyltin dimercaptide, dibutyltin dilaurylmercaptide, dimethyltin dilaurylmercaptide, dimethyltin diisooctylmercaptoacetate, di(n-butyl)tin bis(isooctylmercaptoacetate), and di(isooctyl) tin bis(isooctylmer-captoacetate), all of which are commercially available from Witco Chemical Corp., are also preferred. The use of a delayed action catalyst such as an iron pentanedione or a bismuth carboxylate, as described in U.S. Pat. No. 4,611,044, herein incorporated by reference, is also possible. The most preferred catalyst is nickel acetoacetonate.

Suitable heat-activated catalysts for the present invention include, for example, amine salts. Some examples of these catalysts include aliphatic and aromatic tertiary amines. Suitable heat-activated amine salts include compounds such as, for example, DABCO 8154 commercially available from Air Products, a formic acid blocked triethylene diamine, and other delayed action catalysts such as DABCO WT, also commercially available from Air Products; and Polycat SA-1 and Polycat SA-102 which are both acid-blocked versions of 1,8- diaza-bicyclo[5.4.0]undecene-7 (i.e. Polycat DBU) and commercially available from Air Products.

Trialkyl amines and heterocyclic amines are also suitable for the present invention. Suitable compounds include, for example, trimethyl-amine, triethylamine, tripropylamine, tributylamine, dimethylcyclohexyl-amine, dibutylcyclohexylamine, dimethylethanolamine, triethanolamine, diethylethanolamine, ethyldiethanolamine, dimethyl-isopropanolamine, triisopropanolamine, triethylene diamine, tetramethyl-1,3-butanediamine, N,N,N',N'-tetramethylethylene-diamine, N,N,N',N'-tetramethylhexane-diamine-1,6, N,N,N',N',N"-pentamethyldietnylene-triamine, bis(2-dimethylaminoethoxy)-methane, N,N,N'-trimethyl-N'-(2-hydroxyethyl)ethyl-diamine, N,N-dimethyl-N',N'-(2-hydroxy-ethyl)-ethylenediamine, tetra-methylguanidine, N-methylpiperidine, N-ethylpiperidine, N-methylmorpholine, N-ethylmorpholine, 1,4-dimethyl-piperidine, 1,2,4-trimethyl-piperidine, N-(2-dimethylaminoethyl)-morpholine, 1-methyl-4-(2-dimethyl-amino)-piperidine, 1,4-diazabicyclo-[2.2.2]octane, 2-methyl-1,4-diazabi-cyclo [2.2.2]octane quinuclidine, 1,5-diazabicyclo[5.4.0]-5-undecene, and 1,5-diazabicyclo[4.3.0]-5-nonane.

Organometallic catalysts are usually used in amounts ranging from about 0.001 to about 1.0, preferably about 0.005 to 0.5 parts per 100 parts of isocyanate-reactive material. Tertiary amine (salt) catalysts are advantageously used in amounts ranging from about 0.01 to about 5, preferably about 0.1 to about 2 parts per 100 parts of isocyanate-reactive compounds. It is most preferred that the catalysts be used in quantities such that they comprise less than 1%, preferably less than 0.5% of the total composition.

It is usually desirable to include a filler in the reaction mixture, in order to reduce costs and improve some physical properties. Useful fillers include materials such as, for example, calcium carbonate, alumina tri-hydrate, titanium dioxide, iron oxide, barium sulfate, etc. Of course, it is also possible to use mixtures of these fillers. In general, fillers are usually used in quantities of from about 20 to 300 parts per 100 parts of the polyol mixture.

It is also possible that the polyol mixture includes, for example, flame retardants, surfactants, colorants, antistatic agents, reinforcing fibers, antioxidants, preservatives, water scavengers, blowing agents, and the like.

The reaction mixtures of the present invention are usually foamed by mixing in gases. However, this can also be done using water, and other auxiliary blowing agents, including hydrocarbons, fluorocarbons, fluorohydrocarbons, chlorofluorocarbons, etc.

In the present invention, the term "blowing agent" is used rather broadly to include any compound which may be incorporated into the reaction mixture, as well as other materials which volatilize, decompose, react, or otherwise generate a gas under the conditions encountered in the formation of the polyurethane layer. Frothing is the preferred method of reducing density of the polyurethane, and the preferred blowing agent is air, nitrogen, argon, helium, or another gas that is inert to the reaction mixture. Air and nitrogen are most preferred gases. Alternatively, or in conjunction with the gas, water, low boiling organic compounds (including the halogenated and non-halogenated types), the so-called "azo" blowing agents, and the like can be used.

It is preferred to use a surfactant in the reaction mixture of the present invention. Surfactants include block copolymers of ethylene oxide or mixtures of a major amount of ethylene oxide with a minor amount of propylene oxide and dimethylsiloxane. The more preferred surfactants are block copolymers containing 15 to about 40 weight percent polydimethylsiloxane, a polyether block containing at least about 60 weight percent oxyethylene units, and a molecular weight below 30,000 as described in U.S. Pat. No. 4,483, 894, the disclosure of which is herein incorporated by reference. A sufficient amount of the surfactant is used to stabilize the cells of the foaming reaction mixture until curing occurs, and to produce a uniform-celled foam. In general, such surfactants are used in amounts ranging from 0.01 to about 2 parts per 100 parts by weight of the high molecular weight polyol. The typical surfactants used in polyurethane foam formulations generally decrease the surface energy of the system. Those skilled in the art of polyurethane chemistry are aware of this. Accordingly, care must be taken not only to select a suitable surfactant so that the surface energy of the polyurethane(urea) remains at least 45 dynes/cm, but also to limit the quantity used in the formulation so that the polar contribution to the surface energy remains between at least 10 and 40 dynes/cm.

In preparing polyurethane-backed substrates according to the invention, the individual components of the polyurethane-forming composition are mixed and applied as a layer of preferably uniform thickness onto one surface of the substrate. It is often preferred to pre-mix all components except the isocyanate (and blowing agent when the system is frothed) to form a formulated "B-side". This simplifies the metering and mixing of components at the time the polyurethane-forming composition is prepared. In preparing a frothed polyurethane backing, it is preferred to mix all components and then blend a gas into the mixture, using equipment such as an Oakes or Firestone foamer.

These polyurethane(urea) layers have been found to be particularly effective in producing, for example, carpet backing, unitary or especially precoats; coatings, especially as primers; adhesives, especially for laminating plastic sheets; filled, spray polyurethane elastomers used in structural applications such as whirlpools, spas, bathtubs. Other possible applications include roofing membranes, sound dampening foams, foam shoe inlays, energy absorbing foams, carpet padding, etc.

Suitable substrates for the polyurethane(urea) layers produced from the presently claimed process include textiles, for example, jute, synthetic jute, nonwoven fibers, especially non-woven polypropylene fiber, treated or non-treated release papers. These substrates can be coated with the polyurethane backing in order to produce roofing membranes or polyurethane carpet padding, which is installed prior to cushion backed or non-backed carpet.

The following examples further illustrate details for the process of this invention. The invention, which is set forth in the foregoing disclosure, is not to be limited either in spirit or in scope by these examples. Those skilled in the art will readily understand that known variations of the conditions of the following procedures can be used. Unless otherwise noted, all temperatures are degrees celsius and all parts are parts by weight.

EXAMPLES

POLYOL 1: an ca. 3500 MW PO polyether triol commercially available from Arco Chemical Company as ARCOL 16-52.

POLYOL 2: an ca. 2800 MW PO/EO polyether diol available from Arco Chemical Company as ARCOL E-351.

POLYOL 3: an ca. 2200 MW polyether monol prepared from n-butanol, ethylene oxide, and propylene oxide (molar ratio of ethylene oxide to propylene oxide— 83:17).

DEG: a commercially available mixture consisting of (mainly) diethylene glycol and triethylene glycol.

UL-28: a 25% solution of dimethyltin dilaurate diluted with an ca. 2000 MW polypropylene glycol.

ISO A: an isocyanate having an average isocyanate functionality of about 2.4, an isocyanate content of about 27.3%, containing about 46% monomeric 4,4'-MDI, about 1% monomeric 2,4'- and 2,2'-MD isomers, about 28% higher ring homologues of the MDI series, and the remainder being the adduct of 4,4'-MDI with tripropylene glycol such that the urethane group concentration of the mixture was about 4.2%. The viscosity of the mixture was about 300 mPa·s at room temperature. The mixture was prepared by mixing 50 parts of a 133 equivalent weight polymeric isocyanate mixture having an average functionality of about 2.8 and a 2,4'- and 2,2'-MDI isomer concentration of about 2% with 50 parts of a 182 equivalent weight prepolymer prepared by reacting 4,4'-MDI with tripropylene glycol.

ISO B: an ca. 50:50 mixture of 1) a quasi-prepolymer prepared by reacting 80 parts of polymeric MDI (a 133 equivalent weight polymeric isocyanate mixture having an average functionality of about 2.8 and a 2,4'- and 2,2'-MDI isomer concentration of about 2%) with about 20 parts of Polyol 3 and 2) a 2,4'-isomer rich MDI monomer mixture (comprised of about 45% of 4,4'-MDI and about 55% of 2,4'- and 2,2'-MDI isomers) such that the isocyanate content of the mixture is ca. 29% by weight.

ISO C: an ca. 65:35 mixture of 1) a quasi-prepolymer prepared by reacting 80 parts of polymeric MDI (a 133 equivalent weight polymeric isocyanate mixture having an average functionality of about 2.8 and a 2,4'- and 2,2'-MDI isomer concentration of about 2%) with about 20 parts of Polyol 3 and 2) a 2,4'-isomer rich MDI monomer mixture (comprised of about 45% of 4,4'-MDI and about 55% of 2,4'- and 2,2'-MDI isomers) such that the isocyanate content of the mixture is ca. 27% by weight.

DIOLSULFONATE: a 70% solution in toluene of the sodium bisulfite adduct of ca. 320 MW propoxylated 2-butene-1,4-diol manufactured by Bayer AG for internal use.

N-300: an ca. 1450 MW ethoxylated nonylphenol.

WA-100: sodium lauryl sulfate.

BYK-995: a 50% solution in equal parts of naphtha and 1-methoxy-2-propanol acetate of a mixture of 4% residual phosphoric acid with 96% of a proprietary phosphated polyester commercially offered by BYK-Chemie USA in Wallingford, Conn.

FC-430: a fluorocarbon surfactant available from 3M Company in Minneapolis, Minn. as FLUORAD FC-430.

EXAMPLES 1-6

A mixture consisting of 360 parts of POLYOL 1,320 parts of POLYOL 2, and 120 parts of DEG was prepared. The mixture was cloudy and had a viscosity of ca. 450 mPa·s at 24° C. and became clear when heated above 38° C. To 50 part aliquots of the mixture heated to 50° C., was added ca. 0.04 parts of UL-28 and the amounts of the additives specified in the accompanying table. The resulting mixtures containing catalyst and additives (at 50° C.) were combined with ca. 27.3 parts of ISO A held at room temperature. Layers of the polyurethanes (40 mil wet film thickness) were drawn down onto clean glass plates and placed into a 55° C. oven overnight to allow to cure.

EXAMPLE 7

The same polyol mixture and the procedure of preparing the polyurethane layer as in Examples 1-6 were used; however, the additive was chemically incorporated into the polyisocyanate mixture. The polyol mixture (50 parts) containing catalyst was combined with 25.5 parts of ISO B. About 3.4% of the reactive polar material was thus incorporated into the polyurethane layer.

EXAMPLE 8

The same polyol mixture and the procedure of preparing the polyurethane layer as in Examples 1-6 were used; however, the additive was chemically incorporated into the polyisocyanate mixture. The polyol mixture (50 parts) containing catalyst was combined with 26.7 parts of ISO C. About 4.5% of the reactive polar material was thus incorporated into the polyurethane layer.

Surface energies were calculated using the results of a goniometer to determine the contact angles of water drops (for the polar contribution towards the surface energy) and of methylene iodide drops (for the dispersive or non-polar contribution to the surface energy) on the dried polyurethane layers.

Examples 2-5 and 7-8 are the examples which illustrate the higher surface energies described in the invention. Examples 2-5 illustrate one embodiment of the invention wherein the polar materials are incorporated into the polyol portion of the reactants that form the polyurethane layer with higher surface energies. Examples 7-8 illustrate another preferred embodiment wherein the polar materials are chemically incorporated into the polyisocyanate portion of the reactants that form the layer. Examples 1 and 6 are the comparative examples with the normal lower surface energies typical of these type polyurethane layers. Example 1 is the "control" experiment wherein no surface energy modifying additive was included. Example 6 shows a formulation that contains an additive that lowers the surface energy of the resulting layer compared to the control.

TABLE 1

Surface Energies (Reported in dynes/cm) Of Polyurethane Layers

| Example | Additive | Amount of Additive (%) | Surface Energy Total (p + d) | Polar Surface Energy (p) | Non-polar Surface Energy (d) |
|---|---|---|---|---|---|
| 1 Comp. | None | NA | 42.9 | 9.8 | 33.1 |
| 2 | Diosulfonate | 2 | 53.4 | 16.9 | 36.6 |
| 3 | N-300 | 2 | 52.4 | 15.5 | 36.9 |
| 4 | 90% N-300 and 10% WA-100 | 2 | 53.7 | 16.4 | 37.3 |
| 5 | BY-995 | 2 | 54.3 | 17.6 | 36.8 |
| 6 Comp. | FC-430 | 2 | 13.6 | 4.5 | 9.0 |
| 7 | POLYOL 3 | 3.4 | 47.7 | 10.8 | 36.9 |
| 8 | POLYOL 3 | 4.5 | 50.3 | 15.6 | 34.7 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A unitary carpet backing produced by applying a polyurethane/urea forming reactive mixture to the back of a carpet, wherein said reactive mixture comprises:

A) a compound containing isocyanate groups,

B) a non-polar organic compound containing isocyanate-reactive hydrogen atoms,

C) at least one material selected from the group consisting of 1) reactive non-ionic polar materials,
2) reactive ionic polar materials,
3) non-reactive polar materials, and
4) mixtures thereof, wherein the resultant polyurethane layer has a surface energy from about 45 to 70 dynes/cm at room temperature, and component C) is present in a sufficient amount such that the polar contribution towards the surface energy is between 10 and 40 dynes/cm.

2. A unitary carpet backing produced by the process of claim 1, wherein the total amount of polar materials C) comprises from about 0.5 to 10% by weight, based on the total weight of components A), B) and C).

3. A unitary carpet backing produced by the process of claim 1, wherein the total amount of polar materials C) comprises from about 2 to 6% by weight, based on the total weight of components A), B) and C).

4. A unitary carpet backing produced by the process of claim 1, wherein said reactive mixture comprises:

I) an isocyanate-terminated prepolymer composition prepared from the reaction of A) a compound containing isocyanate groups and C) at least one material selected from the group consisting of 1) reactive non-ionic polar materials, 2) reactive ionic polar materials and 4) mixtures thereof, and II) a component comprising B) a non-polar organic compound containing isocyanate-reactive hydrogen atoms, wherein the resultant polyurethane layer has a surface energy from about 45 to 70 dynes/ore at room temperature, and component C) is present in a sufficient amount such that the polar contribution towards the surface energy is between 10 and 40 dynes/cm.

5. A unitary carpet backing produced by the process of claim 1, wherein said reactive mixture comprises:

I) a component comprising A) a compound containing isocyanate groups, and

II) a blend comprising B) a non-polar organic compound containing isocyanate-reactive hydrogen atoms, and C) at least one material selected from the group consisting of 1) reactive non-ionic polar materials, 2) reactive ionic polar materials, 3) non-reactive polar materials and 4) mixtures thereof, wherein the resultant polyurethane layer has a surface energy from about 45 to 70 dynes/cm at room temperature, and component C) is present in a sufficient amount such that the polar contribution towards the surface energy is between 10 and 40 dynes/cm.

6. A unitary carpet backing produced by the process of claim 1, wherein said reactive mixture comprises:

I) an isocyanate-terminated prepolymer composition prepared from the reaction of A) a compound containing isocyanate groups and C) at least one material selected from the group consisting of 1) reactive non-ionic polar materials, 2) reactive ionic polar materials and 4) mixtures thereof, and II) a blend comprising B) a non-polar organic compound containing isocyanate-reactive hydrogen atoms, and C) at least one material selected from the group consisting of 1) reactive non-ionic polar materials, 2) reactive ionic polar materials, 3) non-reactive polar materials and 4) mixtures thereof wherein the resultant polyurethane layer has a surface energy from about 45 to 70 dynes/cm at room temperature, and component C) is present in a sufficient amount such that the polar contribution towards the surface energy is between 10 and 40 dynes/cm.

7. A carpet backing precoat formed by applying the reactive mixture of claim 1 to the back of a carpet, allowing the reactive mixture to cure, and subsequently forming a second polyurethane or polyurethane-urea layer on top.

8. A carpet backing precoat formed by applying the reactive mixture of claim 4 to the back of a carpet, allowing the reactive mixture to cure, and subsequently forming a second polyurethane or polyurethane-urea layer on top.

9. A carpet backing precoat formed by applying the reactive mixture of claim 5 to the back of a carpet, allowing the reactive mixture to cure, and subsequently forming a second polyurethane or polyurethane-urea layer on top.

10. A carpet backing precoat formed by applying the reactive mixture of claim 6 to the back of a carpet, allowing the reactive mixture to cure, and subsequently forming a second polyurethane or polyurethane-urea layer on top.

* * * * *